(12) United States Patent
Pescod et al.

(10) Patent No.: US 9,810,849 B2
(45) Date of Patent: Nov. 7, 2017

(54) APPARATUS AND METHODS FOR USE WITH OPTICAL ROTATING JOINT

(71) Applicant: BAE SYSTEMS plc, London (GB)

(72) Inventors: Christopher Ralph Pescod, Chelmsford (GB); Mohammed Nawaz, Chelmsford (GB)

(73) Assignee: BAE SYSTEMS plc, London (GB)

( * ) Notice: Subject to any disclaimer, the term of this patent is extended or adjusted under 35 U.S.C. 154(b) by 130 days.

(21) Appl. No.: 14/430,839

(22) PCT Filed: Sep. 24, 2013

(86) PCT No.: PCT/GB2013/052491
§ 371 (c)(1),
(2) Date: Mar. 24, 2015

(87) PCT Pub. No.: WO2014/049342
PCT Pub. Date: Apr. 3, 2014

(65) Prior Publication Data
US 2015/0215589 A1    Jul. 30, 2015

(30) Foreign Application Priority Data

Sep. 25, 2012    (GB) .................................. 1217061.9

(51) Int. Cl.
*G02B 6/36*        (2006.01)
*H04J 14/02*       (2006.01)
(Continued)

(52) U.S. Cl.
CPC ....... *G02B 6/3604* (2013.01); *H04B 10/2504* (2013.01); *H04J 14/02* (2013.01); *H04Q 11/0005* (2013.01); *H04Q 2011/0037* (2013.01)

(58) Field of Classification Search
CPC ... H04B 10/22; H04B 10/2504; G02B 6/3604
(Continued)

(56) References Cited

U.S. PATENT DOCUMENTS 4,529,986 A * 7/1985 d'Auria ................ G02B 6/3604
                                                    342/372
5,392,370 A * 2/1995 Gryk ........................ G02B 6/24
                                                    385/25
(Continued)

FOREIGN PATENT DOCUMENTS

EP    1178338 A2    2/2002
EP    2222000 A1    8/2010
(Continued)

OTHER PUBLICATIONS

International Preliminary Report on Patentability and Written Opinion received for Patent Application No. PCT/GB2013/052490, mailed on Apr. 9, 2015. 7 pages.
(Continued)

*Primary Examiner* — David Payne
*Assistant Examiner* — Casey Kretzer
(74) *Attorney, Agent, or Firm* — Finch & Maloney PLLC (57) ABSTRACT

A method and apparatus for operating an optical rotating joint (2); comprising: routing optical signals through an optical rotating joint (2) by using a first optical circulator (64) on a first side of the optical rotating joint (2) to receive an optical signal and direct the optical signal onward to a first side of the optical rotating joint (2), and using a second optical circulator (93) on a second side of the optical rotating joint (2) to receive the optical signal from the second side of the optical rotating joint (2) and direct it onwards. The signals may be sensor control signals or sensor output signals to/from a plurality of sensors (26, 28, 30), for example camera sensors. The apparatus may further comprise one or more wavelength division multiplexers (68, 94) and/or wavelength division demultiplexers (66, 95).

17 Claims, 6 Drawing Sheets

(51) Int. Cl.
*H04B 10/25* (2013.01)
*H04Q 11/00* (2006.01)

(58) Field of Classification Search
USPC .......................................................... 398/114
See application file for complete search history.

(56) References Cited

U.S. PATENT DOCUMENTS

| | | | |
|---|---|---|---|
| 6,687,010 B1 | 2/2004 | Horii et al. | |
| 6,798,991 B1* | 9/2004 | Davis .................. | H04J 14/0227 398/19 |
| 8,094,319 B2 | 1/2012 | Onimura | |
| 8,848,065 B2* | 9/2014 | Alm .................... | H04N 5/23203 348/211.14 |
| 2003/0004412 A1 | 1/2003 | Izatt et al. | |
| 2004/0141686 A1 | 7/2004 | Schilling et al. | |
| 2006/0093276 A1 | 5/2006 | Bouma et al. | |
| 2007/0140620 A1* | 6/2007 | Schorpp ............... | G02B 6/3604 385/47 |
| 2009/0073455 A1 | 3/2009 | Onimura | |
| 2009/0251704 A1 | 10/2009 | Masuda | |
| 2010/0067902 A1* | 3/2010 | Sun .................... | H04B 10/0799 398/25 |
| 2012/0268578 A1 | 10/2012 | Vertikov et al. | |
| 2013/0279900 A1* | 10/2013 | Kim .................... | H04J 14/0247 398/3 |
| 2015/0253509 A1 | 9/2015 | Pescod et al. | |

FOREIGN PATENT DOCUMENTS

| | | |
|---|---|---|
| EP | 2360491 A1 | 8/2011 |
| JP | 58175330 A | 10/1983 |
| JP | 2000341576 A | 12/2000 |
| WO | 2007130016 A1 | 11/2007 |
| WO | 2014049342 A1 | 4/2014 |

OTHER PUBLICATIONS

International Search Report and Written Opinion received for Patent Application No. PCT/GB2013/052490, mailed on Dec. 6, 2013. 11 pages.
GB Intellectual Property Office Search Report under Section 17(5) received for GB Patent Application No. 1217062.7 mailed Jan. 28, 2013. 3 pages.
International Preliminary Report on Patentability and Written Opinion received for Patent Application No. PCT/GB2013/052491, mailed on Apr. 9, 2015. 8 pages.
Kim, et al., "Determination of engineering strain distribution in a rotor blade with fibre Bragg grating array and a rotary optic coupler," Optics and Lasers in Engineering, vol. 46, Issue 10. Oct. 2008. pp. 758-762. Abstract Only—1 page.
International Search Report and Written Opinion received for Patent Application No. PCT/GB2013/052491, mailed on Dec. 6, 2013. 12 pages.
GB Intellectual Property Office Search Report under Section 17(5) received for GB Patent Application No. 1217061.9 mailed Jan. 28, 2013. 5 pages.

* cited by examiner

APPARATUS AND METHODS FOR USE WITH OPTICAL ROTATING JOINT

FIELD OF THE INVENTION

The present invention relates to apparatus and methods for use with optical rotating joints (also known as fibre optic rotary joints). The present invention relates in particular to, but is not limited to, apparatus and methods in which sensor output signals and sensor control signals are passed through an optical rotating joint.

BACKGROUND

The use of optical rotating joints (ORJs), also known as fibre optic rotary joints (FORJs), for transmission of an optical signal in a fibre-optic cable across an interface between two physical entities, where at least one of the physical entities is rotating, is known. One type of ORJ is a single channel single-mode ORJ, i.e. one in which optical signals are transmitted across the rotating interface from one fixed single-mode optical fibre to one rotating single-mode optical fibre.

In some applications of ORJs, optical plural signals or channels are multiplexed, for example by time-division multiplexing or wavelength-division multiplexing multiple signals on a single optical fibre or channel.

Examples of the above arrangements are described, for example, in a document which was retrieved from the Internet and is an Application Note made available by MOOG Components Group of Moog, Inc., identified as "Document Number 231", entitled "Video/Data Transmission and Distribution in Turreted Vehicles with Situational Awareness Systems", and authored by Glenn Dorsey. The document gives a website www.moog.com/components and an email address mcg@moog.com.

Conventionally, in applications where ORJs are used, redundancy is introduced to alleviate the effects of failure of the ORJ. In many ORJ arrangements, redundancy is conventionally provided at a given physical rotational interface by providing alternative ORJs through which the signals may be diverted, as this is considered relatively pressing due to the perceived mechanical vulnerability of the moving parts in an ORJ.

Quite separate from the field of ORJs, optical circulators are known. For example, the Thorlabs (trademark) website at http://www.thorlabs.com/newgrouppage9.cfm?objectgroup_id=373 provides details of commercially available optical circulators, which may be obtained for example from Thorlabs, LTD., 1 Saint Thomas Place, Ely, Cambridgeshire CB7 4EX, UK.

Quite separate from the field of ORJs, optical switching is known. Examples of optical switching are described, for example, the Dicon Fiberoptics Inc. (trademark) website at http://www.diconfiberoptics.com/products/prd_switches-.php provides details of commercially available optical switches, which may be obtained for example from Dicon Fiberoptics Inc., 1689 Regatta Blvd., Richmond, Calif. 94804, USA. For example available is a range of optical switches that have a single optical fibre input and up to eight switched outputs. More generally, optical switches are available based on mechanical or electro-optic switching technologies.

SUMMARY OF THE INVENTION

The present inventors have realised that known ways of multiplexing optical signals for passing through ORJs have limitations related to number of channels, complexity of implementation, and isolation limitations.

The present inventors have further realised that the conventional provision of redundancy by use of alternative ORJs provided at a given physical rotational interface will often be relatively of little use, especially in relation to its implementation complexity, due to their realising that if mechanical failure of one ORJ occurs then very often the underlying cause of that will be such that the whole of the interface is compromised, i.e. the alternative ORJs will also be prone to the same failure given that a common rotational bearing will tend to be shared by the separate optical channels.

The present inventors have further realised that contrary to conventional considerations, a simpler and more efficient redundancy approach based on optical switching would surprisingly nevertheless tend to provide improved protection compared to the more complex conventional approach.

The present inventors have further realised that their above considerations apply even more strongly in the case of plural video sensor and control signal channels being provided through a single ORJ, in particular through a single-mode ORJ.

In a first aspect, the invention provides a routing system for signals being delivered to and/or received from an optical rotating joint; the system comprising: a first optical circulator, a first port of the first optical circulator arranged to output optical signals to and/or receive optical signals from, an optical rotating joint; a first module arranged to output optical signals to, and/or receive optical signals from, a second port of the first optical circulator; and a second module arranged to output optical signals to, and/or receive optical signals from, a third port of the first optical circulator.

The system may further comprise: a second optical circulator, a first port of the second optical circulator arranged to output optical signals to and/or receive optical signals from, an optical rotating joint; a third module arranged to output optical signals to, and/or receive optical signals from, a second port of the second optical circulator; and a fourth module arranged to output optical signals to, and/or receive optical signals from, a third port of the second optical circulator; wherein the first optical circulator, the first module and the second module are arranged for the first optical circulator to be coupled to a first side of the optical rotating joint; and the second optical circulator, the third module and the fourth module are arranged for the second optical circulator to be coupled to the second side of the same optical rotating joint.

The system may further comprise the optical rotating joint, with one side of the optical rotating joint coupled to the first optical circulator and the other side of the optical rotating joint coupled to the second optical circulator.

The functionality of the modules may comprise being for converting electrical signals to optical signals and/or converting optical signals to electrical signals.

The signals may be sensor control signals and/or sensor output signals.

The signals may be camera sensor control signals and/or camera sensor output signals.

The arrangement of the ports, and their couplings to the modules, may be arranged to provide only sensor control signals through one of the first or second ports of the optical circulator and to provide only sensor output signals through the other of the first or second ports of the optical circulator.

The signals may be sensor control signals or sensor output signals to/from a plurality of sensors.

The system may further comprise one or more wavelength division multiplexers and/or wavelength division demultiplexers.

The system may further comprise: a first optical changeover switch arranged to output optical signals to, and/or receive optical signals from, the optical rotating joint; the first module being further arranged to output optical signals to, and/or receive optical signals from, the first optical changeover switch; the second module being further arranged to output optical signals to, and/or receive optical signals from, the first optical changeover switch; wherein the first optical changeover switch is arranged to switch between: (i) directing the optical signals to/from the optical rotating joint from/to the first module; and (ii) directing the optical signals to/from the optical rotating joint from/to the second module.

The system may further comprise a second optical changeover switch arranged to output optical signals to, and/or receive optical signals from, the optical rotating joint; wherein the second optical changeover switch is arranged to switch between: (i) directing the optical signals to/from the optical rotating joint from/to the first module; and (ii) directing the optical signals to/from the optical rotating joint from/to the second module.

One of the first and second optical changeover switches may be arranged to only forward optical signals to the optical rotating joint, and the other of the first and second optical changeover switches may be arranged to only receive optical signals from the optical rotating joint.

The first optical changeover switch may further be arranged to only process sensor control signals, and the second optical changeover switch may further be arranged to only process sensor output signals.

In a further aspect, the present invention provides a method of operating an optical rotating joint; the method comprising: routing optical signals through an optical rotating joint by using a first optical circulator on a first side of the optical rotating joint to receive an optical signal and direct the optical signal onward to a first side of the optical rotating joint, and using a second optical circulator on a second side of the optical rotating joint to receive the optical signal from the second side of the optical rotating joint and direct it onwards.

The method may further comprise: providing redundancy for camera sensor signals to be passed through the optical rotating joint by: (i) passing signals from a plurality of camera sensors via an optical changeover switching arrangement to the optical rotating joint; and/or (ii) passing signals for a plurality of camera sensors toward the camera sensors from the optical rotating joint via an optical changeover switching arrangement.

DETAILED DESCRIPTION

Figure 1:
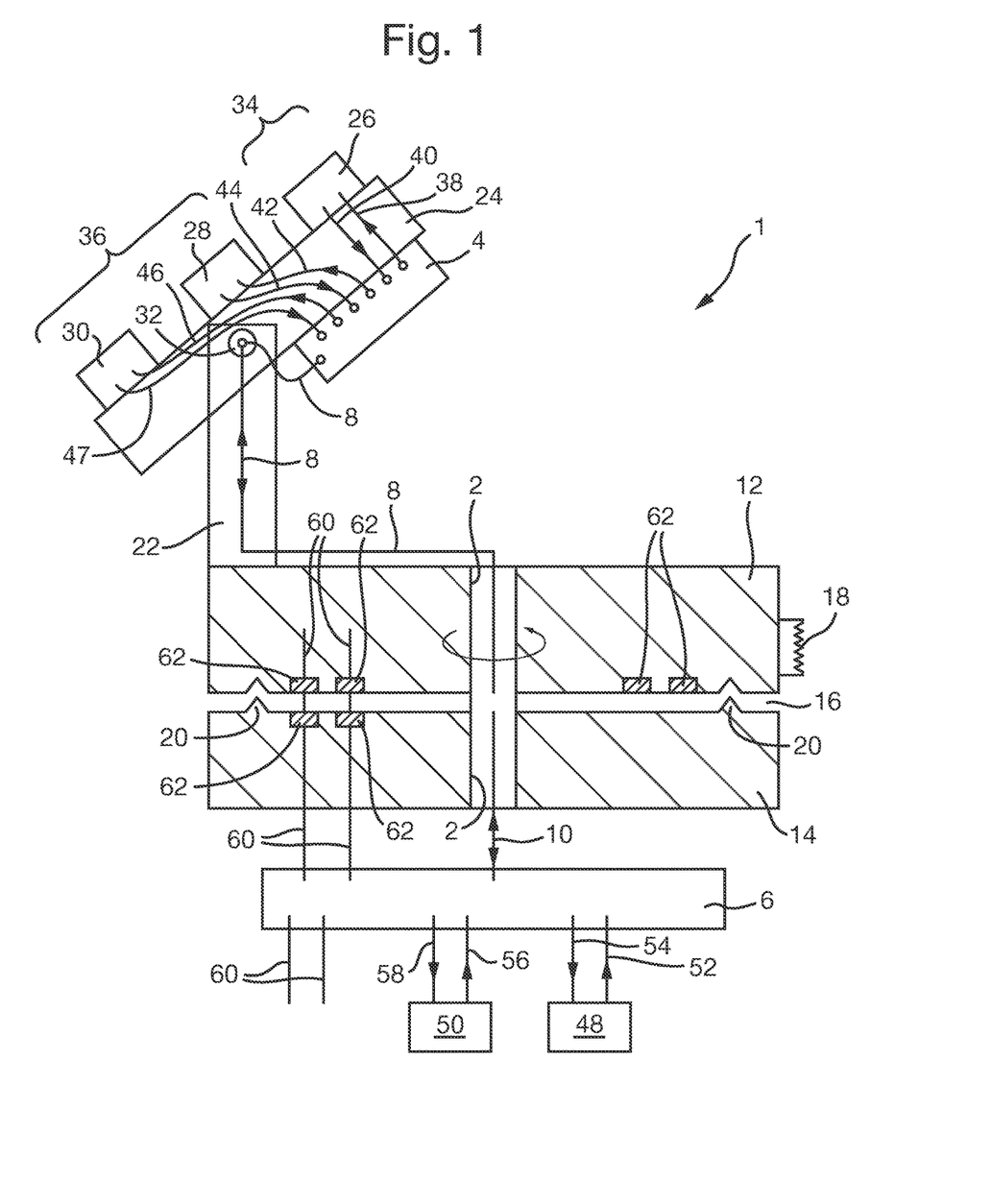
FIG. 1 is a schematic illustration (not to scale) of a first embodiment of an ORJ interface system.

FIG. 1 is a schematic illustration (not to scale) of a first embodiment of an ORJ interface system 1. For convenience also presented is FIG. 2 which is a simplified block diagram illustration of the ORJ interface system 1, in which schematic mechanical details are omitted for ease of reference regarding the electrical and optical couplings present and which will be described in the following.

In the following description, the terminology "a rotating . . . " and "a fixed . . . " is used as a form of annotation for ease of reference to allow the reader to readily appreciate which elements in the particular embodiments described below are on the rotating side of the overall arrangement and which are on the fixed side. It will be appreciated that such terminology is merely used for identification purposes, and does not specify or imply any intrinsic rotation or otherwise (other than by virtue of being on the main rotating platform or not on it) of the particular element so identified.

Figure 2:
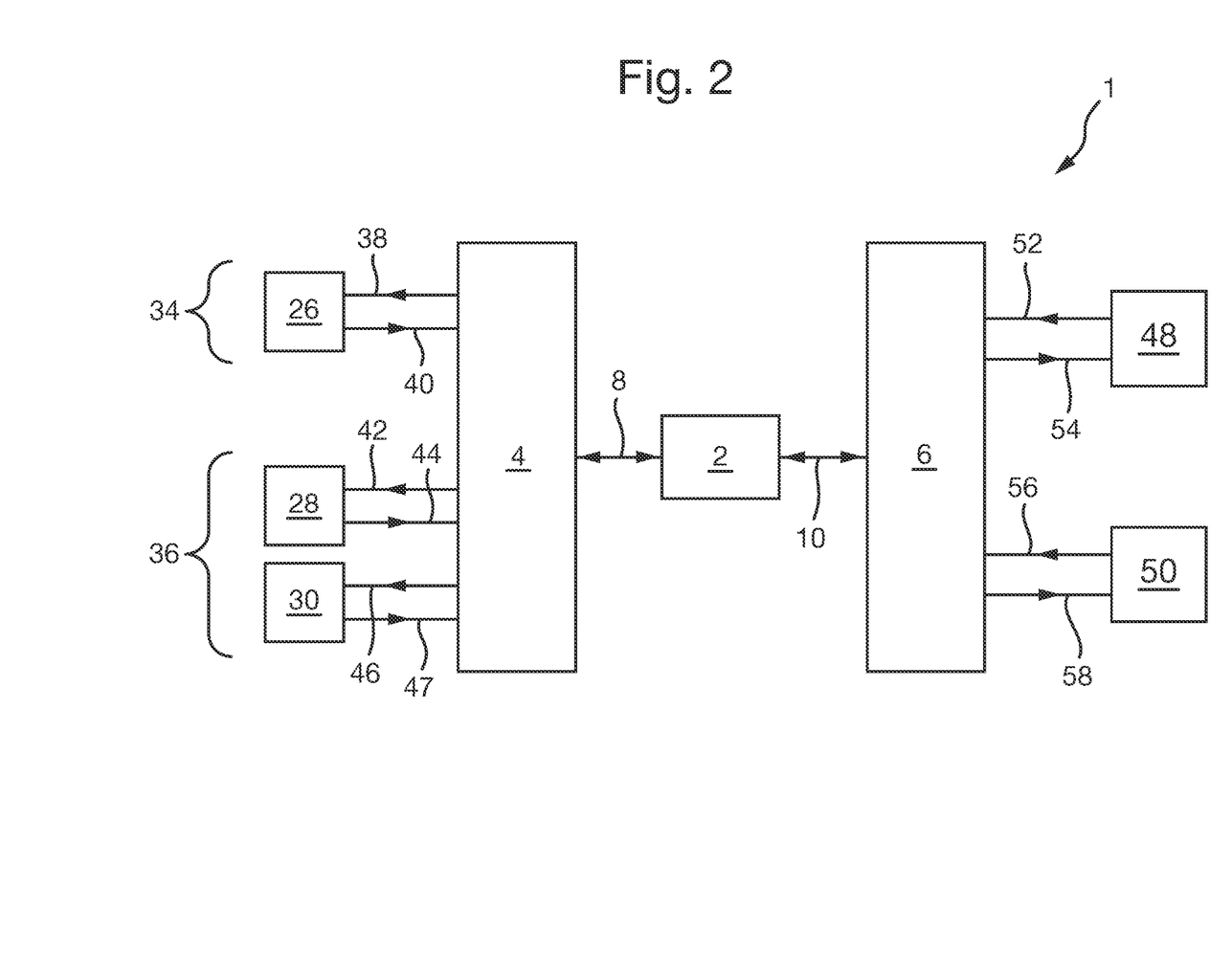
FIG. 2 is a simplified block diagram illustration of the ORJ interface system of FIG. 1.

The ORJ interface system 1 comprises an ORJ 2, a rotating interface module 4, a fixed interface module 6, a rotating optical fibre 8, and a fixed optical fibre 10. On the rotating side of its rotational interface the ORJ 2 is optically coupled to the rotating interface module 4 via the rotating optical fibre 8. On the fixed side of its rotational interface the ORJ 2 is optically coupled to the fixed interface module 6 via the fixed optical fibre 10. In operation the ORJ 2 allows optical signals to be passed between the rotating interface module 4 and the fixed interface module 6 (and vice-versa) via the rotating optical fibre 8 and the fixed optical fibre 10. In this embodiment the optical fibres 8, 10 are single mode optical fibres, and accordingly the ORJ 2 is an ORJ suitable for single mode fibres. However, this need not be the case, and in other embodiments other types of optical fibre, with a corresponding appropriate ORJ, may be used instead.

In this embodiment the ORJ interface system 1 further comprises a rotating platform section 12 and a fixed platform section 14 which in combination mechanically provide the rotational interface 16 served by the ORJ 2 by virtue of the relative rotational motion of the rotating platform section 12 to the fixed platform section 14.

In this embodiment the rotational movement is powered and driven from external mechanical means via a toothed/gearing drive mechanism 18 positioned on the exterior circumference of the rotating platform section 12, and the movement relative to the fixed platform section 14 is further facilitated by a bearings 20 positioned on the face of the fixed platform section 14 that faces the rotating platform section 12.

In this embodiment the ORJ 2 is located in the corresponding axially central positions of the rotating platform section 12 and the fixed platform section 14.

In this embodiment the ORJ interface system 1 further comprises, on its rotating side, the following: a support member 22, a camera mount 24, a first camera sensor 26, a second camera sensor 28, and a third camera sensor 30. The support member 22 is attached in a fixed manner to the rotating platform section 12. The camera mount 24 is fixed in a rotationally jointed manner to the support member 22 to provide a second rotational interface 32 such that in operation the camera mount can be variably tilted compared to the plane of rotation of the rotating platform section 12. In this embodiment the range of tilt movement is only to and fro between certain angles (±120°) giving an overall angular movement range of less than 360°, i.e. the camera mount 24 is not free to rotate one or more 360°, although in other embodiments such 360°+ may be permitted, as will be described later below. In this embodiment therefore (since 360°+ rotation is not performed at the second rotating interface 32) the rotating optical fibre 8 can be provided between the rotating interface module 4 and the ORJ 2 in the form of a single uninterrupted run of optical fibre. Nevertheless, to avoid or alleviate stress or strain on the rotating optical fibre 8 some slack is preferably provided when specifying its length.

In this embodiment the camera sensors 26, 28, 30 are all video camera sensors, but this need not be the case, and in other embodiments one or more of the camera sensors may be other types of sensor. In this embodiment first camera sensor 26 is a colour television (CTV) camera sensor, and both of the camera sensors of the second camera group 36, i.e. the second camera sensor 28 and the third camera sensor 30 are thermal imaging camera sensors.

In this embodiment the camera sensors are operationally arranged into camera groups, where a given camera group contains one or more of the camera sensors. In this embodiment, a first camera group 34 contains the first camera sensor 26, and a second camera group 36 contains the second camera sensor 28 and the third camera sensor 30. In overview redundancy is provided between the second camera sensor 28 and the third camera sensor 30. Further details of this are described later below.

In this embodiment, electrical coupling is provided between the camera sensors 26, 28, 30 and the rotating interface module 4 by the following electrical cables. A first camera control electrical cable 38 and a first camera output electrical cable 40 provide electrical coupling between the first camera sensor 26 and the rotating interface module 4. A second camera control electrical cable 42 and a second camera output electrical cable 44 provide electrical coupling between the second camera sensor 28 and the rotating interface module 4. A third camera control electrical cable 46 and a third camera output electrical cable 47 provide electrical coupling between the third camera sensor 30 and the rotating interface module 4.

Considering now the fixed side of the ORJ interface system 1, it will be appreciated that the fixed interface module may either be fixed mechanically directly to the fixed platform section 14 or, as in this embodiment, fixed mechanically to the fixed platform section only in an indirect manner by being fixed directly or indirectly to an entity that the fixed platform section 14 is also attached to directly or indirectly. For example, the fixed interface module 6 may be fixed to a part of a vehicle body interior and the fixed platform section 14 may be attached to the same vehicle body interior but some distance away, for example 20 m away. This separation distance is readily spanned by use of a suitably long optical fibre cable providing the fixed optical fibre 10.

In this embodiment the ORJ interface system 1 further comprises, on its fixed side, a first camera group output and control module 48 and a second camera group output and control module 50.

In this embodiment, electrical coupling is provided between the fixed interface module 6 and the first camera group output and control module 48 and the second camera group output and control module 50 by the following electrical cables. A first camera group control electrical cable 52 and a first camera group output electrical cable 54 provide electrical coupling between the fixed interface module 6 and the first camera group output and control module 48. A second camera group control electrical cable 56 and a second camera group output electrical cable 58 provide electrical coupling between the fixed interface module 6 and the second camera group output and control module 50.

In this embodiment the ORJ interface system 1 further comprises the following arrangement for providing power through further electrical cable to the rotating interface module 4 via the fixed interface module 6. Various power cables 60 are provided that feed into the fixed interface module 6, that forward power from the fixed interface module 6 to the fixed platform section 14, and that forward power from the rotating platform section 12 to the rotating interface module 4 (to avoid confusion in FIG. 1 the latter are not shown in FIG. 1 beyond the top surface of the rotating platform section 12) but it will be appreciated they extend on to the rotating interface module 4. The rotating platform section 12 and the fixed platform section 14 further comprise in combination a conventional electrical slip ring arrangement 62 for transferring the power over the rotational interface 16.

In operation, control signals are delivered by the ORJ interface system 1 from the camera group output and control modules 48, 50 to the corresponding respective camera sensors 26, 28, 30 via the following sequence of elements: the corresponding respective camera group control electrical cables 52, 56; the fixed interface module 6; the fixed optical fibre 10; the ORJ 2; the rotating optical fibre 8; the rotating interface module 4; and the corresponding respective camera control electrical cables 38, 42, 46. Any appropriate control signals may be sent. For example, in this embodiment these comprise one or more of focus control, aperture control, zoom control, and so on.

In operation, in the reverse direction (as indicated by the opposite direction of the arrows shown in FIGS. 1 and 2 on the electrical cables and optical fibres), output (video) signals from the camera sensors 26, 28, 30 are delivered by the ORJ interface system 1 from the camera sensors 26, 28, 30 to the corresponding respective camera group output and control modules 48, 50 via the following sequence of elements: the corresponding respective camera output electrical cables 40, 44, 47; the rotating interface module 4; the rotating optical fibre 8; the ORJ 2; the fixed optical fibre 10; the fixed interface module 6; and the corresponding respective camera group output electrical cables 54, 58.

Figure 3:
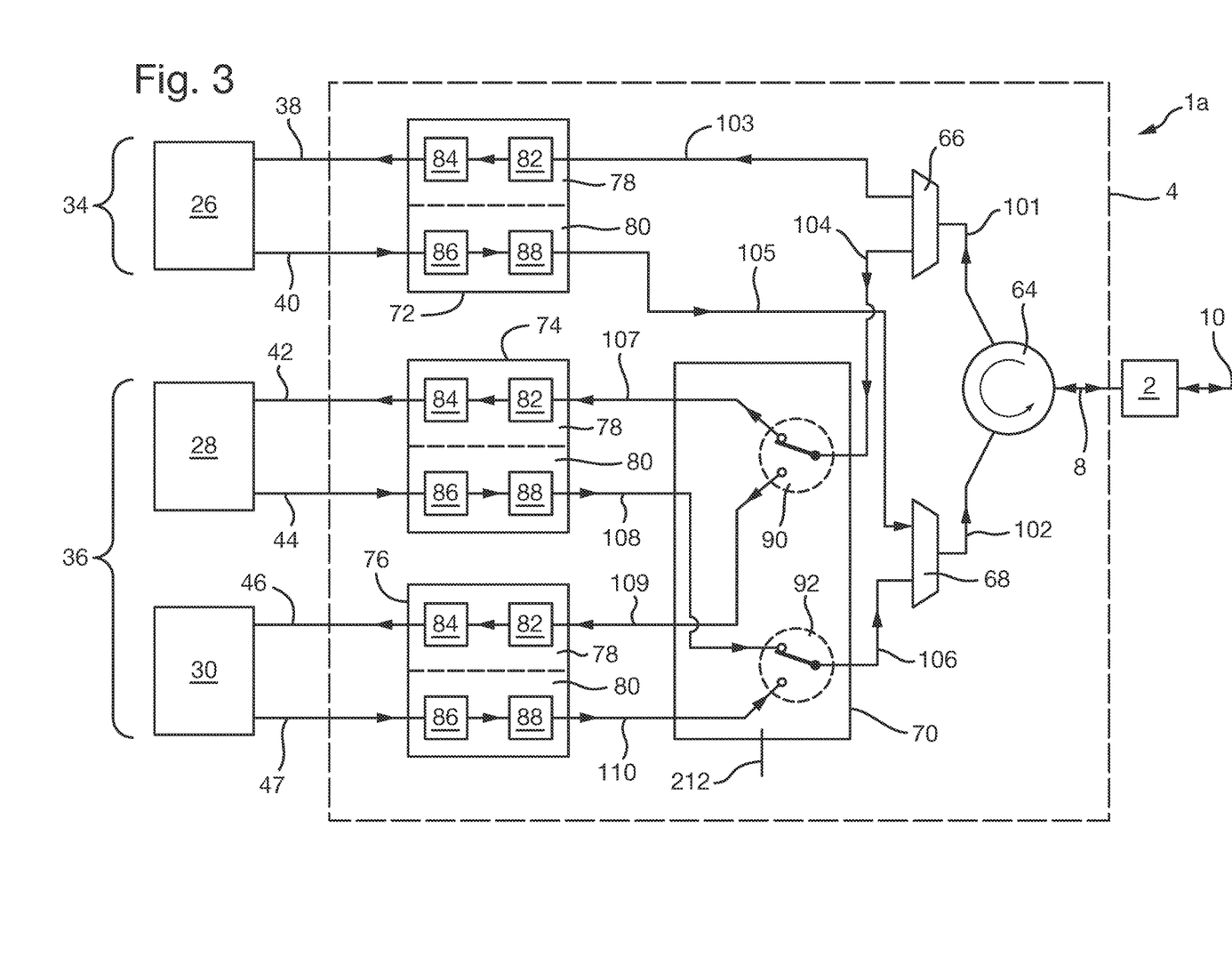
FIG. 3 is a simplified block diagram illustration of a part of the ORJ interface system of FIGS. 1 and 2.

Further details of the rotating interface module 4 will now be described with reference to FIG. 3. FIG. 3 is a simplified block diagram illustration of a part 1a of the ORJ interface system 1 that lies between, and includes, the ORJ 2 and the camera sensors 26, 28, 30.

The rotating interface module 4 comprises the following elements: a rotating optical circulator 64, a first rotating wavelength division multiplexer-demultiplexer 66, a second rotating wavelength division multiplexer-demultiplexer 68, an optical switching module 70, a first camera module 72, a second camera module 74, and a third camera module 76.

Each camera module 72, 74, 76 comprises a control branch 78 and an output branch 80. The control branch 78 of each camera module 72, 74, 76 comprises an optical receiver 82 coupled to a control module 84. The output branch of each camera module 72, 74, 76 comprises a video converter module 86 coupled to an optical transmitter 88.

The optical switching module 70 comprises a first optical switch for switching control signals, hereinafter referred to as the control signal switch 90. The optical switching module 70 further comprises a second optical switch for switching output (e.g. video) signals, hereinafter referred to as the output signal switch 92.

In the following description, each link is an optical link, for example a fibre optic cable with any appropriate connections etc., unless otherwise stated or unless self-evidently not applicable.

The rotating optical circulator 64 is optically coupled as follows: to the ORJ 2 via the rotating optical fibre 8; to the rotating wavelength division demultiplexer 66 via a first link 101; and to the rotating wavelength division multiplexer 68 via a second link 102.

The rotating wavelength division demultiplexer 66 is further optically coupled as follows: to the control branch 78 of the first camera module 72 via a third link 103; and to the control signal switch of 90 of the optical switching module 70 via a fourth link 104.

The rotating wavelength division multiplexer 68 is further optically coupled as follows: to the output branch 80 of the first camera module 72 via a fifth link 105; and to the output signal switch 92 of the optical switching module 70 via a sixth link 106.

The control signal switch optical switching module 70 is further optically coupled as follows: to the control branch 78 of the second camera module 74 via a seventh link 107; to the output branch 80 of the second camera module 74 via an eighth link 108; to the control branch 78 of the third camera module 76 via a ninth link 109; and to the output branch 80 of the third camera module 76 via a tenth link 110.

The control signal switch 90 is an optical changeover switch that is arranged to switchably couple the fourth link 104 to either the seventh link 107 or the ninth link 109.

The output signal switch 92 is an optical changeover switch that is arranged to switchably couple the sixth link 106 to either the eighth link 108 or the tenth link 110. Any suitable optical switch may be used, for example earlier mentioned as available from Dicon Fiberoptics Inc.

An electrical input 212 and if desired one or more processors (not shown) are provided as part of the optical switching module 70 to allow switching control signals for controlling the switching of the switches 90, 92 to be received. This is discussed later below. These switching control signals may be received from any appropriate source in any appropriate form.

The control module 84 of the first camera module 72 is electrically coupled to the first camera sensor 26 via the first camera control electrical cable 38. The video converter module 86 of the first camera module 72 is electrically coupled to the first camera sensor 26 via the first camera output electrical cable 40.

The control module 84 of the second camera module 74 is electrically coupled to the second camera sensor 28 via the second camera control electrical cable 42. The video converter module 86 of the second camera module 74 is electrically coupled to the second camera sensor 28 via the second camera output electrical cable 44.

The control module 84 of the third camera module 76 is electrically coupled to the third camera sensor 30 via the third camera control electrical cable 46. The video converter module 86 of the third camera module 76 is electrically coupled to the third camera sensor 30 via the third camera output electrical cable 47.

In this embodiment, in operation, control signals for the camera sensors 26, 28, 30 received by the ORJ 2 from the fixed interface module 6 are delivered by the rotating interface module 4 from the ORJ 2 to the camera sensors 26, 28, 30, as will now be described in more detail.

Wavelength multiplexed control signals (in optical form) for the camera sensors 26, 28 and 30 are passed from the ORJ 2 to the rotating optical circulator 64 via the rotating optical fibre 8.

The rotating optical circulator 64 directs the wavelength multiplexed control signals to the rotating wavelength division demultiplexer 66 via the first link 101. Further details of the operation of the rotating optical circulator 64 will be described later below.

The rotating wavelength division demultiplexer 66 demultiplexes the different wavelength signals into respective signals for the first camera group 34 and the second camera group 36.

The rotating wavelength division demultiplexer 66 forwards the control signals for the first camera group 34 (i.e. in this embodiment the first camera sensor 26) to the optical receiver 82 of the first camera module 72 via the third link 103.

The rotating wavelength division demultiplexer 66 forwards the control signals for the second camera group 36 to the control signal switch 90 of the optical switching module 70 via the fourth link 104.

(It will be appreciated that in this embodiment the arrangement of modules and couplings is such that the rotating wavelength division demultiplexer 66 only performs demultiplexing. However, for design flexibility, in other variations of this embodiment it could be replaced by a wavelength division multiplexer-demultiplexer.)

As mentioned earlier above, the control signal switch 90 is an optical changeover switch that is arranged to switchably couple the fourth link 104 to either the seventh link 107 or the ninth link 109 (i.e. in effect to forward the control signals to either the second camera sensor 28 or the third camera sensor 30). Hence, when the active camera sensor of the second camera group 36 is the second camera sensor 28, the switching signal input via input 212 selects (or maintains an existing selection) for the control signal switch 90 to direct the control signals to the optical receiver 82 of the second camera module 74 via the seventh link 107. And, at other times, when the active camera sensor of the second camera group 36 is the third camera sensor 30, the switching signal input via input 212 instead selects (or maintains an existing selection) for the control signal switch 90 to direct the control signals to the optical receiver 82 of the third camera module 76 via the ninth link 109.

At the first camera module 72, and at the active camera module 74 or 76 serving the second camera group 36, the optical receiver 82 outputs an electrical response of the received optical form control signals which are then processed in conventional manner by the control module 84 to produce an electrical form of the control signals. Thus the control branch 78 of each camera module 72, 74, 76 performs (amongst other possible actions) in effect optical to electrical conversion of the control signals.

The control signals in electrical form are forwarded to the corresponding camera sensor over the respective camera control electrical cable i.e. the control signals in electrical form for the first camera sensor 26 are forwarded to the first camera sensor 26 via the first camera control electrical cable 38, and the control signals in electrical form for the second camera group 36 are forwarded, when it is the active camera sensor, to the second camera sensor 28 via the second camera control electrical cable 42, or, when it is the active camera sensor, to the third camera sensor 30 via the third camera control electrical cable 46.

In operation, in the reverse direction (as indicated by the opposite direction of the arrows shown in FIGS. 1, 2 and 3 on the electrical cables, optical fibres, and other electrical and optical couplings), output (video) signals from the camera sensors 26, 28, 30 are delivered by the rotating interface module 4 from the camera sensors 26, 28, 30 to the ORJ 2 for forwarding to the fixed interface module 6, as will now be described in more detail.

Output (video) signals from the first camera sensor 26 are forwarded to the video converter module 86 of the first camera module 72 via the first camera output electrical cable 40.

Depending on which of the camera sensors of the second camera group 36 is currently the active camera sensor, then either output (video) signals from the second camera sensor 28 are forwarded to the video converter module 86 of the second camera module 74 via the second camera output electrical cable 44, or output (video) signals from the third camera sensor 30 are forwarded to the video converter module 86 of the third camera module 76 via the third camera output electrical cable 47.

At the first camera module 72, and at the active camera module 74 or 76 serving the second camera group 36, the respective video converter 86 converts the respective video standard format of the particular camera sensor output (e.g. HD-SDI, PAL, etc.), which may be analogue or digital, to a common digital format that is then modulated by the respective optical transmitter 88 to provide a common format optical signal that is then forwarded on as will be described below. Because this embodiment uses wavelength division multiplexing, the optical transmitter 88 of the first camera module 72 transmits at a different wavelength compared to the wavelength transmitted by the optical transmitters 88 of the second camera module 74 and the third camera module 76. In this embodiment the wavelengths employed are ones specified in the ITU-T Recommendation G694.2, which allocates specific wavelengths that are in the range 1270 nm to 1611 nm and which have 20 nm spacing between channels. In other embodiments, other wavelength values may be used in addition or instead.

Thus in this embodiment a same optical channel is advantageously used for all the video formats and only the detail of the video converter 86 needs to be different if the different video signals are in different formats (alternatively more complex video converters able to perform conversion of different video signal formats may be employed if desired to allow commonality of parts). Thus the output branch 80 of each camera module 72, 74, 76 performs (amongst other possible actions) in effect electrical to optical conversion of the output signals.

The optical form of the output signal derived from the first camera sensor 26 is forwarded from the optical transmitter 88 of the first camera module 72 to the rotating wavelength multiplexer 68 via the fifth link 105.

Depending on which of the camera sensors of the second camera group 36 is currently the active camera sensor, then either the optical form of the output signal derived from the second camera sensor 28 is forwarded from the optical transmitter 88 of the second camera module 74 to the output signal switch 92 of the optical switching module 70 via the eighth link 108, or the optical form of the output signal derived from the third camera sensor 30 is forwarded from the optical transmitter 88 of the third camera module 76 to the output signal switch 92 of the optical switching module 70 via the tenth link 110.

As mentioned earlier above, the output signal switch 92 is an optical changeover switch that is arranged to switchably couple either the eighth link 108 or the tenth link 110 to the sixth link 106 (i.e. in effect to forward the output signals from either the second camera sensor 28 or the third camera sensor 30 to the rotating wavelength multiplexer 68 via the sixth link). Hence, when the active camera sensor of the second camera group 36 is the second camera sensor 28, the switching signal input via input 212 selects (or maintains an existing selection) for the output signal switch 92 to direct the output signals from the optical transmitter 88 of the second camera module 74 to the rotating wavelength multiplexer 68 via the sixth link. And, at other times, when the active camera sensor of the second camera group 36 is the third camera sensor 30, the switching signal input via input 212 instead selects (or maintains an existing selection) for the output signal switch 92 to direct the output signals from the optical transmitter 88 of the third camera module 76 to the rotating wavelength multiplexer 68 via the sixth link.

The rotating wavelength division multiplexer 68 multiplexes the different wavelength signals so that they can all be passed at the same time to the rotating optical circulator 64 (and thereafter onward to, and across, the ORJ 2) i.e. the rotating wavelength division multiplexer 68 forwards the wavelength multiplexed output signals to the rotating optical circulator 64 via the second link 102.

(It will be appreciated that in this embodiment the arrangement of modules and couplings is such that the rotating wavelength division multiplexer 68 only performs multiplexing. However for design flexibility this could in other variations of this embodiment be replaced by a wavelength division multiplexer-demultiplexer.)

The rotating optical circulator 64 directs the wavelength multiplexed output signals to the ORJ 2 via the rotating optical fibre 8. Further details of the operation of the rotating optical circulator 64 will be described later below.

Figure 4:
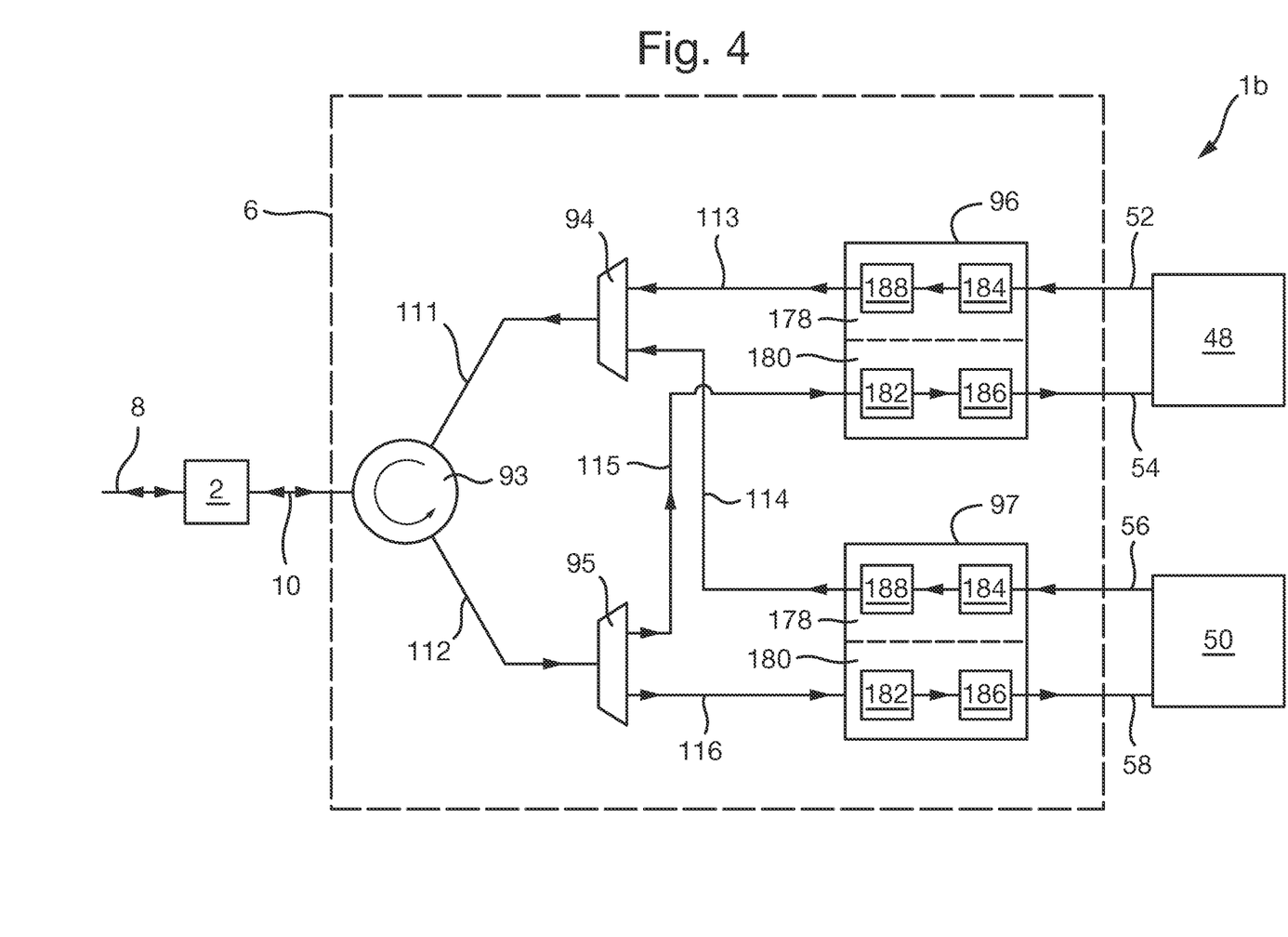
FIG. 4 is a simplified block diagram illustration of another part of the ORJ interface system of FIGS. 1 and 2.

Further details of the fixed interface module 6 will now be described with reference to FIG. 4. FIG. 4 is a simplified block diagram illustration of a part 1b of the ORJ interface system 1 that lies between, and includes, the ORJ 2 and the camera group output and control modules 48, 50 (note the ORJ 2 is included in both parts 1a and 1b for ease of reference). In overview the fixed interface module 6 comprises elements that broadly speaking correspond to some of those of the rotating interface module 4, and their operation similarly corresponds, except that operation and coupling arrangements are reversed in directional sense compared to the rotating interface module 4. Further detail will now be described.

The fixed interface module 6 comprises the following elements: a fixed optical circulator 93, a fixed wavelength division multiplexer 94, a fixed wavelength division demultiplexer 95, a first camera group fixed module 96, and a second camera group fixed module 97.

Each camera group fixed module 96, 97 comprises a control branch 178 and an output branch 180. The control branch 178 of each camera group fixed module 96, 97 comprises an optical transmitter 188 coupled to a control module 184. The output branch of each camera group fixed module 96, 97 comprises a video converter module 186 coupled to an optical receiver 182.

In the following description, each link is an optical link, for example a fibre optic cable with any appropriate connections etc., unless otherwise stated or unless self-evidently not applicable.

The fixed optical circulator 93 is optically coupled as follows: to the ORJ 2 via the fixed optical fibre 10; to the fixed wavelength division multiplexer 94 via an eleventh link 111; and to the fixed wavelength division demultiplexer 95 via a twelfth link 112.

The fixed wavelength division multiplexer 94 is further optically coupled as follows: to the control branch 178 of the first camera group fixed module 96 via a thirteenth link 113; and to the control branch 178 of the second camera group fixed module 97 via a fourteenth link 114.

The fixed wavelength division demultiplexer 95 is further optically coupled as follows: to the output branch 180 of the first camera group fixed module 96 via a fifteenth link 115; and to the output branch 180 of the second camera group fixed module 97 via a sixteenth link 116.

The control module 184 of the first camera group fixed module 96 is electrically coupled to the first camera group output and control module 48 via the first camera group control electrical cable 52. The video converter module 186 of the first camera group fixed module 96 is electrically coupled to the first camera group output and control module 48 via the first camera group output electrical cable 54.

The control module 184 of the second camera group fixed module 97 is electrically coupled to the second camera group output and control module 50 via the second camera group control electrical cable 56. The video converter module 186 of the second camera group fixed module 97 is electrically coupled to the second camera group output and control module 50 via the second camera group output electrical cable 58.

In this embodiment, in operation, output signals from the camera sensors 26, 28, 30 received by the ORJ 2 from the rotating interface module 4 (as described earlier above with reference to FIG. 3) are delivered by the fixed interface module 6 from the ORJ 2 to the first and second camera group output and control modules 48, 50, as will now be described in more detail.

The wavelength multiplexed output signals (in optical form) for the first and second camera group output and control modules 48, 50 are passed from the ORJ 2 to the fixed optical circulator 93 via the fixed optical fibre 10.

The fixed optical circulator 93 directs the wavelength multiplexed output signals to the fixed wavelength division demultiplexer 95 via the twelfth link 112. Further details of the operation of the fixed optical circulator 93 will be described later below.

The fixed wavelength division demultiplexer 95 demultiplexes the different wavelength signals into respective signals from the first camera group 34 and the second camera group 36.

The fixed wavelength division demultiplexer 95 forwards the output signals from the first camera group 34 (i.e. in this embodiment from the first camera sensor 26) to the optical receiver 182 of the first camera group fixed module 96 via the fifteenth link 115.

The fixed wavelength division demultiplexer 95 forwards the output signals from the second camera group 36 to the optical receiver 182 of the second camera group fixed module 97 via the sixteenth link 116. The output signals from the second camera group 36 will have come from the active/selected one of the second camera sensor 28 and the third camera sensor 30.

(It will be appreciated that in this embodiment the arrangement of modules and couplings is such that the fixed wavelength division demultiplexer 95 only performs demultiplexing. However for design flexibility in other variations of this embodiment it could be replaced by a wavelength division multiplexer-demultiplexer.)

At the first camera group fixed module 96, and at the second camera group fixed module 97, the optical receiver 182 outputs an electrical response of the received optical form output signals which are then processed in conventional manner by the video converter module 186 to produce an electrical form of the output signals in the appropriate video standard formats. Thus the output branch 180 of each camera group fixed module performs (amongst other possible actions) in effect optical to electrical conversion of the output signals.

The output signals in electrical form are forwarded to the corresponding camera group output and control module over the respective camera group output electrical cable i.e. the output signals in electrical form from the first camera sensor 26 are forwarded to the first camera group output and control module 48 via the first camera group output electrical cable 54, and the output signals in electrical form from the active/selected camera sensor of the second camera group 36 are forwarded to the second camera group output and control module 50 via the second camera group output electrical cable 58.

In operation, in the reverse direction (as indicated by the opposite direction of the arrows shown in FIGS. 1, 2 and 4 on the electrical cables, optical fibres, and other electrical and optical couplings), control signals are delivered by the fixed interface module 6 from the first and second camera output and control modules 48, 50 to the ORJ 2 for forwarding to the rotating interface module 4, as will now be described in more detail.

Control signals from the first camera output and control module 48 are forwarded to the video control module 184 of the first camera group fixed module 96 via the first camera group control electrical cable 52.

Depending on which of the camera sensors of the second camera group 36 is currently the active camera sensor, then either control signals for the second camera sensor 28 or control signals for the third camera sensor 30 are forwarded to the control module 184 of the second camera group fixed module 97 via the second camera group control electrical cable 56.

At the first camera group fixed module 96, and at the second camera group fixed module 97, the respective control module 184 and respective optical transmitter operate in conventional manner to perform further interface operations, including appropriately modulating the control signals into optical signals that are then forwarded on as will be described below. Because this embodiment uses wavelength division multiplexing, the optical transmitter 188 of the first camera group fixed module 96 transmits at a different wavelength compared to the wavelength transmitted by the optical transmitter 188 of the second camera group fixed module 97. Thus the output branch 178 of each of the first and second camera group fixed modules 96, 97 performs (amongst other possible actions) in effect electrical to optical conversion of the control signals.

The optical form of the control signal derived from the first camera group output and control module 48 is forwarded from the optical transmitter 188 of the first camera group fixed module 96 to the fixed wavelength multiplexer 94 via the thirteenth link 113.

The optical form of the control signal derived from the second camera group output and control module 50 is forwarded from the optical transmitter 188 of the second camera group fixed module 97 to the first wavelength multiplexer 94 via the fourteenth link 114.

The fixed wavelength division multiplexer 94 multiplexes the different wavelength signals so that they can all be passed at the same time to the fixed optical circulator 93 (and thereafter onward to, and across, the ORJ 2), i.e. the fixed wavelength division multiplexer 94 forwards the wavelength multiplexed control signals to the fixed optical circulator 93 via the eleventh link 111.

(It will be appreciated that in this embodiment the arrangement of modules and couplings is such that the fixed wavelength division multiplexer 94 performs only multiplexing. However for design flexibility in other variations of this embodiment be replaced by a wavelength division multiplexer-demultiplexer.)

The fixed optical circulator 93 directs the wavelength multiplexed control signals to the ORJ 2 via the fixed optical fibre 10. Further details of the operation of the fixed optical circulator 93 will be described later below.

Further details of the operation of the rotating optical circulator 64 and the fixed optical circulator 93 in the above embodiment will now be described with reference to FIG. 5 and FIG. 6.

Figure 5:
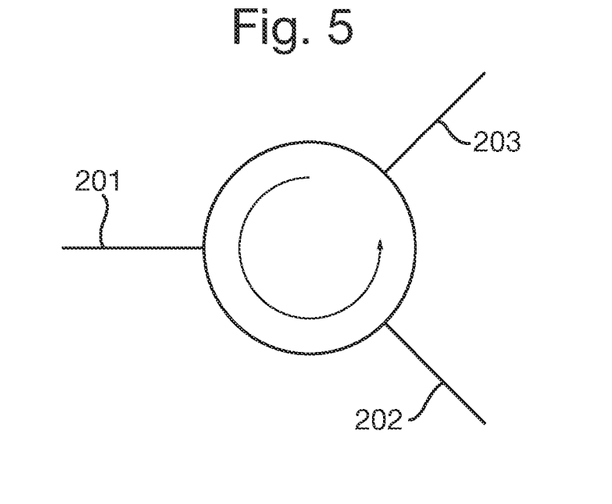
FIG. 5 is a schematic illustration of an optical circulator.

FIG. 5 is a schematic illustration of an optical circulator such as the above mentioned optical circulators 64, 93. An optical circulator is a fibre-optic component that is conventionally used to separate optical signals that travel in opposite directions in an optical fibre. An optical circulator is a three-port device (indicated in FIG. 5 by reference numerals 201, 202, and 203) designed such that light entering any port exits from the next. This means in the example of FIG. 5 if light enters the first port 201 it is emitted from the second port 202, if light enters the second port 202 it is emitted from the third port 203, and if light enters the third port 203 it is emitted from the first port 201.

Figure 6:
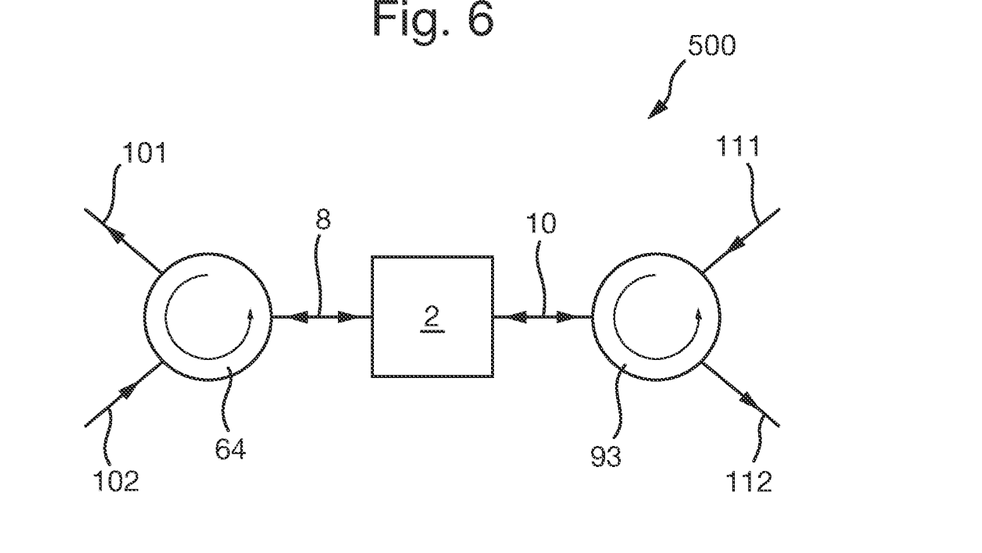
FIG. 6 is a block diagram of an ORJ routing system.

FIG. 6 is a block diagram showing for ease of explanation the above described first link 101, second link 102, rotating optical circulator 64, rotating optical fibre 8, ORJ 2, fixed optical fibre 10, fixed optical circulator 93, eleventh link 111, and twelfth link 112, which together can be considered as providing an ORJ routing system 500. The couplings between these elements have already been described earlier above. By virtue of appropriately aligning the required input/output directions with the rotational sense of each optical circulator 64, 93, the above described routing of the various control and output signals is achieved. This is because the ORJ routing system 500 routes optical signals input to the fixed optical circulator 93 from the eleventh link 111 specifically to the first link 101; and correspondingly the ORJ routing system 500 routes optical signals input to the rotating optical circulator 64 from the second link 102 specifically to the twelfth link 112.

Advantageously, by virtue of this the ORJ routing system 500 allows different optical signals or groups of optical signals to be routed as required at the opposing side of the ORJ despite the ORJ passing multiple such optical signals or groups of optical signals, whilst also allowing the same wavelengths to be used in the opposite directions through the ORJ 2, thus allowing a lesser degree of wavelength division multiplexing to be employed to achieve a given number of channels overall (indeed, if only one control signal and one output signal was required to be provided, a wavelength division multiplexer-demultiplexer arrangement could be omitted completely).

Moreover, returning to when wavelength division multiplexing/demultiplexing is employed in combination with the ORJ routing system 500, as in the above embodiment, advantageously the ORJ routing system 500 also allows the possibility (if a suitable module and coupling arrangement/layout is employed, such as the one in the above described embodiment) for separate wavelength division multiplexers to be used for control and output signals respectively, i.e. the control signals can be directed through one multiplexer/demultiplexer of a given interface module and the output signals can be directed through a separate multiplexer/demultiplexer of the given interface module, thereby avoiding or alleviating interference.

However, it will also be appreciated that in yet further embodiments the couplings and modules may be arranged such that signals may pass through the different ports of the optical circulators in both directions. This would tend to mean the advantages described above regarding isolation were reduced or non-existent, however such arrangements would still be advantageous in the sense that additional routing channels would be provided for a given number of wavelength multiplexing divisions.

Although in the above embodiments the optical circulators are the first elements to be coupled on each side of the ORJ, this need not be the case, and in other embodiments other elements may be inserted between either or both of the optical circulators and the ORJ. For example, wavelength division multiplexing may be performed on the ORJ side of the optical circulator instead of on the other side thereof as in the above embodiments.

Although in the above embodiments there is only one optical circulator to either side of the ORJ, it will be appreciated that this need not be the case, and in other embodiments plural optical circulators may be provided in one or both of the interface modules. One possibility is for two or more optical circulators to provide parallel routes. Another possibility is to provide a cascade branching hierarchy.

Figure 7:
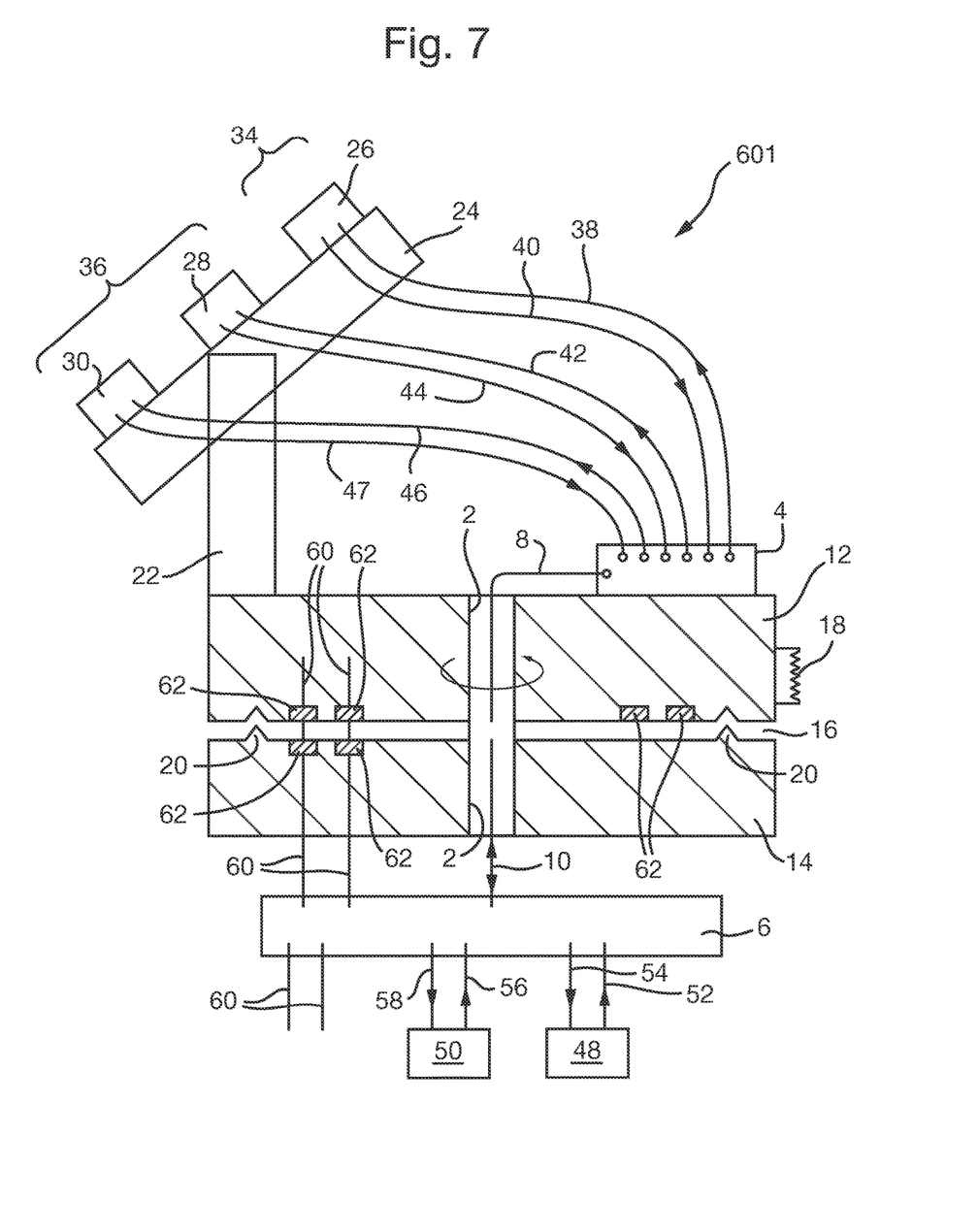
FIG. 7 is a schematic illustration (not to scale) of a further embodiment of an ORJ interface system.

FIG. 7 is a schematic illustration (not to scale) of a further embodiment of an ORJ interface system 601. Unless stated otherwise, the elements included, and the arrangement and operation thereof, is the same as that described above for the ORJ interface system 1 of FIG. 1, and accordingly the same reference numerals are used to indicate the same or corresponding elements in FIG. 7 as are used in FIG. 1. Indeed, since the electrical and optical couplings in the ORJ interface system 601 are the same as described above for the first embodiment of an ORJ interface system 1, FIGS. 2-6 and accompanying description apply also to the ORJ interface system 601 of FIG. 7.

As indicated schematically in FIG. 7, the further embodiment of the ORJ interface system 601 differs by comparison to that of the first embodiment of the ORJ interface system 1 as follows.

(i) The camera mount 24 is mechanically attached in a fixed manner to the support member 22, i.e. the second rotating interface 32 is omitted, and there is no tilt movement or freedom of movement between the camera mount 24 and the support member 22.

(ii) The rotating interface module 4 is mechanically attached to the rotating platform section 12 rather than to the camera mount 24. Since under this arrangement the relative position of the camera sensors 26, 28, 30 to the rotating interface module 4 will not change when the rotating platform 12 rotates, the camera control electrical cables 38, 42, 46 and the camera output electrical cables 40, 44, 47 may be provided without slack, however if desired slack may be provided.

In yet further embodiments, either of the above differences may be implemented in isolation without the other.

Returning to consideration of the optical switching module, ways in which switching control signals may be received at its switching control input 212 by the optical switching module 70 from any appropriate source in any appropriate form will now be discussed. The optical switching module 70 switching control input 212 can be derived a number of ways. By way of example one possibility is to detect if camera sensors 28 or 30 have failed and the control input 212 would be used to select the functioning camera. By way of example another possibility is that the camera group output and control module 50 can include data within the digital control signal to control the input 212.

Generally, in addition to the embodiments described above, in further embodiments any number of camera groups may be defined, and some or all of these camera groups may have redundancy or other camera switching capability provided. For example, a total of six camera sensors may be provided, arranged into three camera groups each comprising two sensors. In another example having six camera sensors, four camera groups may be defined, two of which each only have a single camera sensor (i.e. no redundancy provided by optical switching), and the other two of which have two camera sensors each i.e. both have redundancy provided by optical switching. Also, in yet further embodiments, one or more camera groups may comprise more than two camera sensors.

In further embodiments, in addition to, or instead of, providing the optical switching on the rotating side of the ORJ as in the above embodiments, optical switching to provide redundancy (of control modules, video converters or optical converters etc.) may be provided on the fixed side.

As will be appreciated from the earlier discussion above about the many different possible ways in which the switching by the optical switching module may be controlled, provision of types of multiple-capacity other than strictly redundancy provision may be employed. For example, for a camera group having two camera sensors, the two camera sensors can be different types of camera sensor, whose use is switched between without one of them necessarily having failed. For example one might be a night vision camera sensor and the other a daylight video camera sensor, and they are switched manually or automatically to operate at different times of the day and night. It will be appreciated that many other possibilities may readily be implemented by the skilled person.

In the above embodiments signals are passed in both directions across the ORJ. However, this need not be the case, and in other embodiments signals are only sent unidirectional, e.g. only control signals or only sensor output signals, or some other form of signal.

The arrangement of different functionalities in the described modules, and the arrangement of given modules within other modules, in the above embodiments, is not essential, and in other embodiments such functionalities and modules may be arranged differently to how described above. For example, the different elements of the rotating interface module may be distributed amongst more than one physical housing, and so on. The same applies, for example, to the fixed interface module. Likewise, the arrangement of respective control branches and output branches in separate camera modules may be rearranged, with for example all control signals directed to a control signal receiving module and all sensor outputs directed to a separate module therefor. The same or corresponding considerations apply to, for example, the camera group modules.

One advantage of the above described arrangement of modules (and alternatives as discussed in the preceding paragraph) is that end-users may if desired conveniently make use of a first enclosure containing all the elements of the rotating interface module 4 and a second enclosure containing all the elements of the fixed interface module 6.

For any of the above discussed module arrangements, a further possible advantage regarding may be achieved by providing different required video standards etc. by means of choices of insert program cards, plug-and-play approaches, and the like. Examples of this that are made possible by the above arrangements will now be discussed in more detail.

The rotating interface module 4 may have a number of optical transmit/receive modules with their wavelengths selected to match the wavelengths specified in the international Coarse Wavelength Division Multiplex plan (i.e. previously mentioned the ITU-T Recommendation G694.2). These would be connected to, for example, an 8 or 16 channel wavelength division multiplexer/demultiplexer. At the time of ordering from a manufacturer a customer may define whether they wanted an 8 or 16 channel system.

The optical transmit/receive modules may be based on the international standardised Coarse Wavelength Division Multiplex Small Form Pluggable (SFP) optical transceivers.

A plug-and-play aspect may come from the use of plug-in video converter modules that have an electrical input socket that will take either Camera link, GigEvision, HD-SDI or PAL video signals, for example. These modules would physically plug into slots in the enclosure housing the rotating interface module and electrically connect to the optical transmit/receive modules described in the previous paragraph.

HDMI and DVI digital format camera video signals and component (RGB or Y/Pb/Pr) analogue format camera video signals, for example, may be converted to HD-SDI video format external to the enclosure housing the rotating interface module. The electrical output of these video converter modules would plug into the SFP optical transceivers.

The video converter modules may be in PC-card or PCI express format cards as used with laptop computers or like a PCI or PCI express expansion card used in a desktop computer. Thus surprisingly in the conventionally engineer-heavy environment of ORJ installations a surprisingly simple approach analogous to a laptop computer purchaser specifying a number of PC-Card or PCI-express slots when the laptop is purchased may be implemented.

The same considerations may apply to the fixed interface module. The same 8/16 channel wavelength division multiplexing/demultiplexing and SFP optical transmit/receive optical modules may be used as in the rotating interface module. The plug-in video converter modules would convert the optical received signal to the required video format.

The fixed interface module plug-in video converter module could also be used to perform a video standards conversion if the original camera video format is not compatible with available monitors or video capture devices.

Also, the details of the camera modules and likewise of the camera group fixed modules of the above embodiments are only one way in which electrical to optical conversion, optical to electrical conversion, video conversion, optical modulation, optical transmission and reception, etc. may be carried out, and in other embodiments some or all of these are implemented in other ways readily available to the skilled person.

In the above embodiments the sensors are on a part that is conveniently considered as rotating relative to a fixed part. However, clearly when there is relative rotation either (or both) entity may be considered as rotating compared to the other, and hence such terminology is not used in a limiting sense herein.

In the above embodiments the ORJ is used to communicate signals to and from camera sensors, however this need not be the case, and in other embodiments signals for or from other types of apparatus may be passed via the ORJ in addition to, or instead of, signals related to sensors. For example communications data and Radio Frequency transmit or receive signals may be passed through the ORJ.

In any of the above embodiments, the camera group output and control modules may be arranged to forward the received output data to any desired further entities, for example video recorders, displays, and so on. Correspondingly, in any of the above embodiments, the camera group output and control modules may be arranged to receive the control data or data from which it can determine control data from any desired further entities.

In the above embodiments there is only a single ORJ, and moreover the ORJ is a single-channel ORJ. However, this need not be the case, and in other embodiments multi-channel ORJs may be used instead, with appropriately increased numbers of the other described components.

In the above embodiments the ORJ (or in the case of the preceding paragraph multi-channel ORJs) is a single mode fibre ORJ. However, this need not be the case, and in other embodiments one or more multi-mode fibre ORJs may be used instead or in addition to a single mode fibre ORJ.

In the above embodiments the arrangements include optical switching as a way of providing redundancy. However, it will be appreciated that in yet further embodiments, such optical switching and resulting redundancy advantages may be omitted, whilst still tending to achieve advantages related to the inclusion of one or more optical circulators.

Apparatus for implementing the above described modules and other processing entities may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

The invention claimed is:

1. A routing system for optical signals being delivered to and received from an optical rotating joint, the system comprising:
    a rotating structure coupled to the optical rotating joint such that the rotating structure is arranged to rotate with respect to the optical rotating joint;
    a first optical circulator on the rotating structure, the first optical circulator coupled to a first side of the optical rotating joint, and the first optical circulator having a first port arranged to output second and third optical signals to, and receive first optical signals from, the first side of the optical rotating joint;
    a first camera sensor on the rotating structure, the first camera sensor coupled to a second port of the first optical circulator, and the first camera sensor arranged to receive, via a first optical receiver coupled to the first camera sensor, the first optical signals from the second port of the first optical circulator and to output, by a first optical transmitter coupled to the first camera sensor, the second optical signals to a third port of the first optical circulator;
    a second camera sensor on the rotating structure, the second camera sensor coupled to the third port of the first optical circulator, and the second camera sensor arranged to output, via a second optical transmitter coupled to the second camera sensor, the third optical signals to the third port of the first optical circulator; and
    a wavelength division multiplexer on the rotating structure, the wavelength division multiplexer coupled to the third port of the first optical circulator, the wavelength division multiplexer arranged such that the optical rotating joint can, at the same time, output the first optical signals to the first optical receiver of the first camera sensor on the rotating structure and receive the second and third optical signals from the first optical transmitter of the first camera sensor and the second optical transmitter of the second camera sensor on the rotating structure, respectively.

2. The system according to claim 1, further comprising:
    a second optical circulator, a first port of the second optical circulator being arranged to output the first optical signals to, and receive the second and third optical signals from, the optical rotating joint;
    a third camera sensor arranged to receive the second optical signals from a second port of the second optical circulator and to output the first optical signals to a third port of the second optical circulator; and
    a fourth camera sensor arranged to receive the third optical signals from the second port of the second optical circulator,
    wherein:
        the first optical circulator, the first camera sensor, and the second camera sensor are arranged for the first optical circulator to be coupled to a first side of the optical rotating joint; and
        the second optical circulator, the third camera sensor, and the fourth camera sensor are arranged for the second optical circulator to be coupled to another side of the optical rotating joint.

3. The system according to claim 2, further comprising the optical rotating joint, with the first side of the optical rotating joint being coupled to the first optical circulator and the other side of the optical rotating joint being coupled to the second optical circulator.

4. The system according to claim 2, further comprising a wavelength division demultiplexer operatively coupled between the second optical circulator and each of the third and fourth modules, wherein the wavelength division multiplexer is operatively coupled between the first optical circulator and each of the first and second modules.

5. The system according to claim 1, wherein the first camera sensor and second camera sensor are each configured for at least one of converting second and third electrical signals to the second and third optical signals, respectively, and converting the first optical signals to first electrical signals.

6. The system according to claim 1, wherein the first, second, and third optical signals are sensor control signals or sensor output signals.

7. The system according to claim 6, wherein the first, second, and third optical signals are camera sensor control signals or camera sensor output signals.

8. The system according to claim 6, wherein the second and third ports of the first optical circulator, and their couplings to the first camera sensor and second camera sensor, are arranged to provide only the sensor control signals through the second port of the first optical circulator and to receive only the sensor output signals through the third port of the first optical circulator.

9. The system according to claim 1, wherein the first, second, and third optical signals are sensor control signals to, or sensor output signals from, a plurality of sensors.

10. The system according to claim 1, wherein the second camera sensor is further arranged to receive fourth optical signals from the second port of the first optical circulator, the system further comprising a wavelength division demultiplexer arranged such that the optical rotating joint further can, at the same time, output the first and fourth optical signals to the first camera sensor and the second camera sensor, respectively, and receive the second and third optical signals from the first camera sensor and the second camera sensor, respectively.

11. The system according to claim 1, further comprising:
a third camera sensor arranged to receive the first optical signals from the second port of the first optical circulator; and
an optical changeover switch arranged to receive the first optical signals from the optical rotating joint,
the first camera sensor being further arranged to receive the first optical signals from the optical changeover switch,
the third camera sensor being further arranged to receive the first optical signals from the optical changeover switch,
wherein the optical changeover switch is arranged to switch between:
directing the first optical signals from the optical rotating joint to the first camera sensor; and
directing the first optical signals from the optical rotating joint to the third camera sensor.

12. The system according to claim 1, further comprising:
a third camera sensor arranged to output the third optical signals to the third port of the first optical circulator; and
a first optical changeover switch arranged to output the third optical signals to the optical rotating joint,
the third camera sensor being further arranged to output the third optical signals to the first optical changeover switch,
the second camera sensor being further arranged to output the third optical signals to the first optical changeover switch,
wherein the first optical changeover switch is arranged to switch between:
directing the third optical signals to the optical rotating joint from the third camera sensor; and
directing the third optical signals to the optical rotating joint from the second camera sensor.

13. The system according to claim 12, further comprising:
a second optical changeover switch arranged to receive fourth optical signals from the optical rotating joint,
the third camera sensor being further arranged to receive the fourth optical signals from the second port of the first optical circulator and from the second optical changeover switch,
the second camera sensor being further arranged to receive the fourth optical signals from the second port of the first optical circulator and from the second optical changeover switch,
wherein the second optical changeover switch is arranged to switch between:
directing the fourth optical signals from the optical rotating joint to the third camera sensor; and
directing the fourth optical signals from the optical rotating joint to the second camera sensor.

14. The system according to claim 13, wherein the second optical changeover switch is further arranged to only process sensor control signals, and the first optical changeover switch is further arranged to only process sensor output signals.

15. The system according to claim 12, wherein the wavelength division multiplexer is operatively coupled between the first optical changeover switch and the first optical circulator.

16. A method of operating an optical rotating joint, the method comprising:
routing first and second optical signals through an optical rotating joint that is coupled to a rotating structure, such that the rotating structure is arranged to rotate with respect to the optical rotating joint, by:
wavelength division multiplexing the first and second optical signals using a wavelength division multiplexer on the rotating structure coupled to a first side of the optical routing joint;
receiving the wavelength division multiplexed first and second optical signals at a first optical circulator on the rotating structure, the first optical circulator coupled to the first side of the optical rotating joint and directing the received first and second optical signals through the first optical circulator to the first side of the optical rotating joint, the first optical circulator having a first port arranged to output second and third optical signals to, and receive first optical signals from, the first side of the optical rotating joint;
receiving, via a first optical receiver coupled to a first camera sensor, the first optical signals from a second port of the first optical circulator, wherein the first camera sensor is on the rotating structure and is coupled to a second port of the optical circulator;
outputting, via a first optical transmitter coupled to the first camera sensor, the second optical signals to a third port of the first optical circulator;
outputting, via a second optical transmitter coupled to a second camera sensor, third optical signals to a third port of the first optical circulator, wherein the second camera sensor is on the rotating structure and is coupled to the third port of the optical circulator;
further receiving the directed first and second optical signals at a second optical circulator on a second side of the optical rotating joint and outputting the further received first and second optical signals from the optical rotating joint to a wavelength division demultiplexer on the second side of the optical rotating joint; and
wavelength division demultiplexing the outputted first the outputted first and second optical signals using the wavelength division demultiplexer.

17. The method according to claim 16, the method further comprising:
providing redundancy for camera sensor signals to be passed through the optical rotating joint by at least one of:
passing first camera sensor signals from a plurality of camera sensors via a first optical changeover switch to the optical rotating joint; and
passing second camera sensor signals for the plurality of camera sensors toward the camera sensors from the optical rotating joint via a second optical changeover switch.

* * * * *